(12) United States Patent
Mozart Fusco et al.

(10) Patent No.: US 6,197,266 B1
(45) Date of Patent: Mar. 6, 2001

(54) SYSTEM FOR SEALING A CYCLONE LEG

(75) Inventors: Jose Mozart Fusco, Niteroi; Eduardo Cardoso De Melo Guerra, Petropolis; Valmor Neves Vieira, Sao Mateus do Sul, all of (BR)

(73) Assignee: Petroleo Brasileiro S. A.-Petrobras (BR)

( * ) Notice: Subject to any disclaimer, the term of this patent is extended or adjusted under 35 U.S.C. 154(b) by 0 days.

(21) Appl. No.: 09/101,353

(22) PCT Filed: Dec. 27, 1996

(86) PCT No.: PCT/BR96/00068
§ 371 Date: Oct. 28, 1998
§ 102(e) Date: Oct. 28, 1998

(87) PCT Pub. No.: WO97/24412
PCT Pub. Date: Jul. 10, 1997

(30) Foreign Application Priority Data

Jan. 2, 1996 (BR) .................................................. 9600002

(51) Int. Cl.<sup>7</sup> .................................................. B65G 53/60
(52) U.S. Cl. ............................................ 422/147; 406/173
(58) Field of Search ..................................... 422/145, 147, 422/195, 213, 217; 55/342; 406/173

(56) References Cited

U.S. PATENT DOCUMENTS

| 2,901,331 | 8/1959 | Held et al. | 422/145 |
| 4,246,231 | 1/1981 | Figler et al. | 422/147 |
| 4,324,563 | * 4/1982 | Jones et al. | 48/62 R |
| 4,362,442 | * 12/1982 | Bentzen-Bilkvist et al. | 406/109 |
| 4,871,514 | 10/1989 | Ross | 422/195 |

FOREIGN PATENT DOCUMENTS 2 212 248   7/1989 (GB) .

* cited by examiner

*Primary Examiner*—Marian C. Knode
*Assistant Examiner*—Alexa A. Doroshenk
(74) *Attorney, Agent, or Firm*—Nixon & Vanderhye PC

(57) ABSTRACT

A cyclone leg sealing system is composed of one or more intermediate solids-accumulation chambers delimited by two sealing valves and in series, the function of the valves being to prevent the back-flow of particulate material towards the inside of the separating cyclones in fluid catalytic cracking (FCC) processes, thereby ensuring the maximum efficiency of the separating effected by the cyclone.

9 Claims, 4 Drawing Sheets

SYSTEM FOR SEALING A CYCLONE LEG

FIELD OF THE INVENTION

This application is the national phase of international application PCT/BR96/00068 filed Dec. 27, 1996 which designated the U.S.

The present invention relates to a system for sealing the leg of a cyclone for separating out solids from a particulate suspension.

More specifically, the present invention presents on arrangement of valves at the ends of the legs of cyclones to promote improved sealing of the system.

More particularly, the present invention presents a system for sealing the legs of seperation cyclones which are used in fluid catalytic cracking (FCC) processes.

BACKGROUND OF THE INVENTION

In the field of separating out solid particles in gaseous suspension it is customary to use cyclones as the mechanism for separating out the suspended solids. Such cyclones normally have a valve at their ends where the solid material is discharged or, as is more well-known, at the ends of the legs of the cyclones. This valve acts as a sealing element, preventing a gaseous counterflow current towards the inside of the cyclone, which would considerably reduce its separation efficiency. On the other hand, however well the valve is designed, it is mechanically impossible for a single valve to eliminate completely the draw-back of solid particles due to the counterflow of the gaseous current in the interval between the opening and subsequent closing of the valve.

In the specific case of fluid catalytic cracking (FCC) processes, it is known that the internal pressure in the cyclone is always below the pressure of the separating vessel surrounding it, which requires the use of sealing valves at the lower end of the legs of the cyclones.

Next, a critical point, which directly influences the efficiency of the FCC process, is the seal provided by the sealing valves in the cyclone legs. As they have to operate under fairly harsh conditions, such as temperatures in excess of 500° C. and a solids charge rate of the order of 20–50 t/min, these valves do not normally provide a perfect seal, so they permit to some extent the passage of gas from the separating vessel towards the inside of the leg of the cyclone. A flow in excess of 0.5% of the total volume fed into the inlet port of the cyclone causes draw-back of the fine solid particles, which disrupts the operation of the cyclone and thereby reduces its separation efficiency.

As an alternative solution, GB-A-2,272,248 proposes the use of a deadweight valve which provides a virtually total seal through the pressure of a conical section installed between the base of the valve and the seat of the leg of the cyclone.

However, it is important to remember that a small amount of gas passing through the sealing valve, of the order of 0.01 to 0.5% of the total volume fed into the port of the cyclone, is beneficial since it causes fluidification of the solid which will have accumulated in the leg of the cyclone, which promotes its discharge.

In this way, an attempt to prevent the passage of the gas flow through the valve, as proposed by the aforementioned patent, may give rise to the loss of fluidification of the solid which has accumulated in the leg of the cyclone, principally in the second phase of separation when the charge of solids is fairly dilute, e.g. of the order of 0.2 to 7.5 grams of particulate per cubic meter of gas. Under such operating conditions the accumulation of solids, leading to a balance in pressure and resulting discharge of the solids, may require a period in excess of eight hours to effect adequate build-up and, if there is not a minimum flow of gas through the valve, the dense bed of particulates may become "packed down", with the consequent risk of complete obstruction of the leg of the cyclone and a drop in the efficiency of the cyclone.

OBJECT OF THE INVENTION

The present invention aims to solve these problems involving draw-back of particluates during the opening cycle of the cyclone-leg sealing valve, thus maintaining the high operating efficiency of the cyclone, in a simple, inexpensive and safe manner.

It is a further object of the present invention to provide a system for sealing the legs of separation cyclones used in fluid catalytic cracking (FCC) processes which totally prevents a counterflow of gas towards the inside of the leg of the cyclone with no risk of the dense bed of particulates "packing down".

SUMMARY Of THE INVENTION

Accordingly the present invention provides a sealing system for the leg of a cyclone for separating out solids in particulate suspension, characterized in that, at the lower end of the leg of the cyclone, there is an arrangement of two or more sealing valves mounted in series with an intermediate solids-accumulation chamber between two successive said sealing valves; in that an upper said valve is intended to promote sealing between the inside of the leg of the cyclone and the inside of the intermediate solids-accumulation chamber; and in that a lower said valve is intended to promote sealing between the inside of the intermediate solids-accumulation chamber and the inside of a separating vessel.

BRIEF DESCRIPTION OF THE DRAWINGS

The invention will now be described in greater detail with reference to the drawings which accompany this specification and in which.

DESCRIPTION OF THE PREFERRED EMBODIMENT

Figure 1:
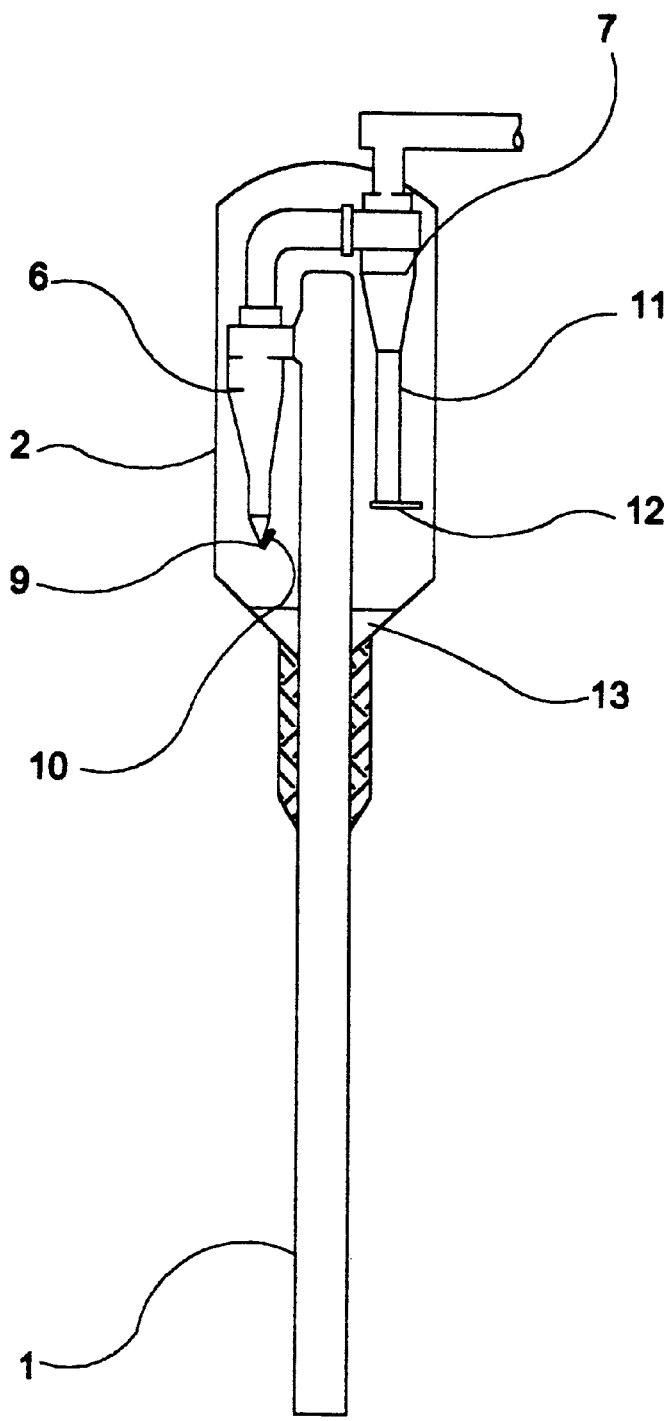
FIG. 1 is a typical diagrammatic view of the reaction/separation assembly of a standard FCC unit.

FIG. 1 shows a standard reaction/separation unit for an FCC process. Such a unit consists of an ascending-low tubular reactor ("RISER") 1, a separating vessel 2 and the cyclone separators 6 and 7 in series.

The traditional technique, familiar to those skilled in the field of petroleum refining, consists in promoting cracking reactions in a charge of hydrocarbons, in gaseous phase in suspension with catalyst particles along the entire length of the riser 1. As a result of the reactions, a corbonaceous deposit is formed on the surface of the catalyst.

At the top end of the riser 1, the suspended coked catalyst particles are rapidly separated from the cracked hydrocarbons. The effluent current from the reaction therefore enters the first cydone separator 6 where the greater port of the suspended catalyst is separated out and flows, under gravity, in free fall to the leg 9 of the cyclone 6 where it is retained by the sealing valve 70, which is shown, by way of example, as a drip valve.

Figure 3:
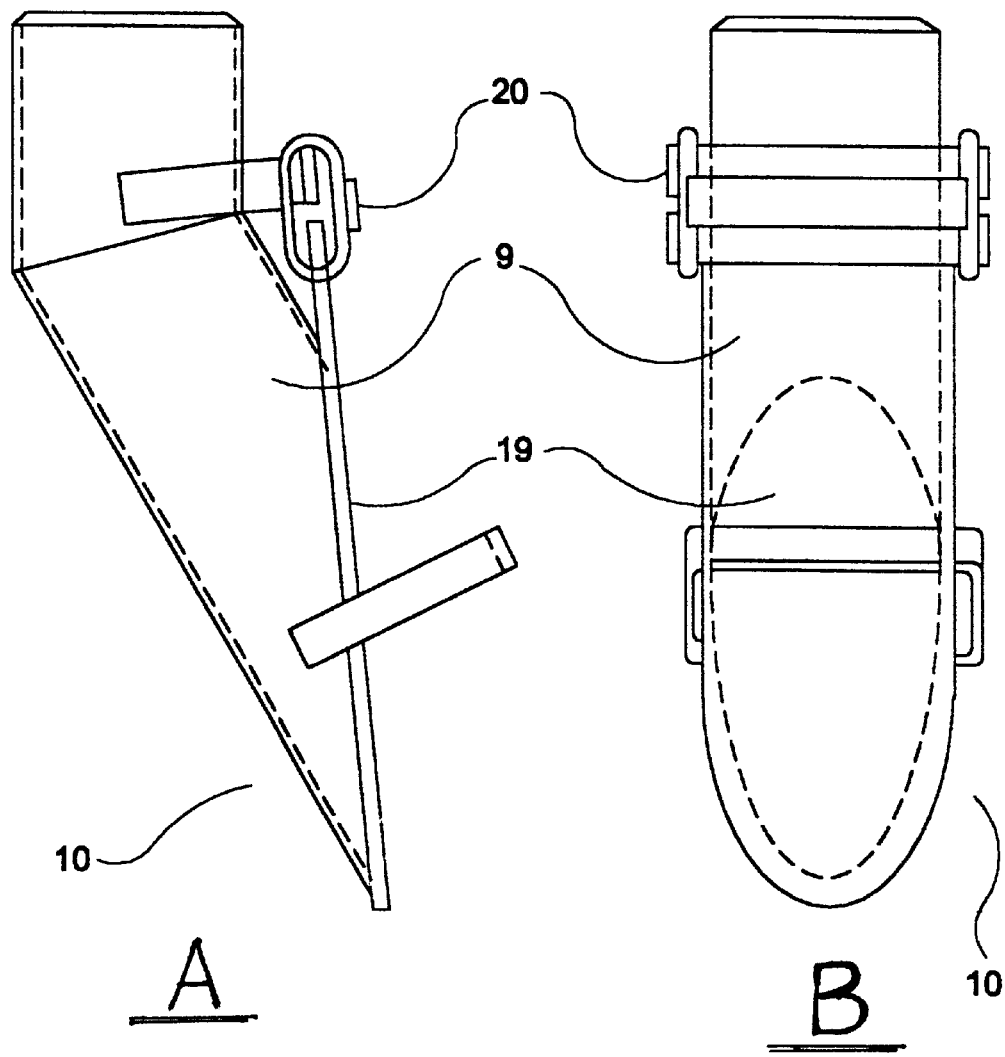
FIGS. 3*a* and 3*b* are, respectively, a side profile view and a front profile view of a conventional drip valve.

FIG. 3 shows the sealing valve 10, called the drip valve, in greater detail. Such a valve consists basically of a metal plate 19 of approximately elliptical shape secured to the end of the leg 9 of the cyclone by means of an articulation 20. The valve is sealed by the actual weight of the plate 19, which forms an angle of from 4 to 7 degrees with the vertical plane when it bears on the inclined end of the cyclone leg 9.

Returning to a description of the conventional unit shown in FIG. 1, the cracked hydrocarbons separated out in the first cyclone 6, also drawing along finer particles of catalyst, penetrate into the second cyclone 7 where they are completely separated out, the gaseous phase passing onward to external systems for fractionating the entrained cracked products. The finer particles of catalyst just as occurred earlier in the cyclone 6, descend to the leg 11 of the cyclone 7, and are there retained in the sealing valve 12, which is shown, by way of example, as a deadweight valve.

Figure 2:
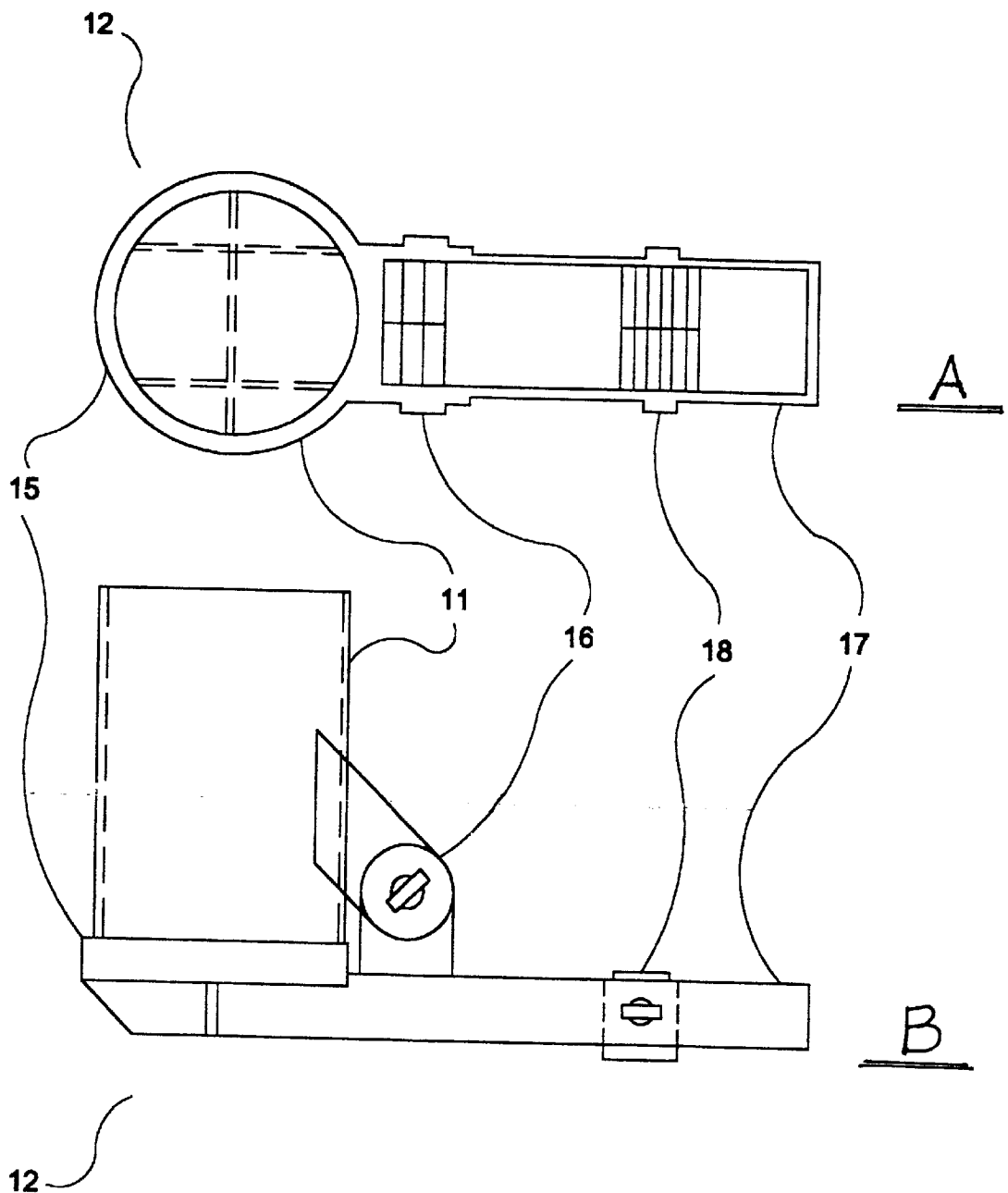
FIGS. 2*a* and 2*b* are, respectively, a plan view and an elevational view, both showing a conventional deadweight valve.

FIG. 2 shows in greater detail this sealing valve 12, called a deadweight valve. Such a valve consist of a sealing disc 15 whose entire surface area bears on and covers the annular end of the discharge section of the leg 11 of the cyclone, and closes the leg. The disc 15 is secured to the leg by means of an articulation 16 mounted on an arm 17, which carries a counterweight 18 but enables the valve to open in accordance with the quantity of solid particles present inside the leg 11 of the cyclone. The valve is closed and sealed by means of the action of the counterweight 18, which may be secured in any position on the arm 17, to adjust the closing force, the arm being arranged in the manner of a lever.

Returning once again to a description of the conventional unit shown in FIG. 1, the columns of catalyst particles which accumulate on the lids of the sealing valves 10, 12 give rise, at a specific instant in the process, to a pressure balance between the inner, lower part of the legs 9, 11 of the cyclones 6, 7 and the interior of the separating vessel 2, normally at a pressure higher than those prevailing inside the cyclones. The closure 15 or 19 of the valve is therefore opened through the equalization in pressures, and the column of solids which has accumulated in the leg of the respective cyclone flows towards the fluidized bed 13 which accumulates in the lower port of the separating vessel 2. The conditions of a balance in pressures now cease and the lid of the valve returns to the closed position.

This is the most critical moment of the separating phase and, owing to a virtually inevitable gas-current counterflow through the leg of the cyclone due to the time interval which is necessary for the sealing valve to close completely it is virtually impossible to prevent some draw-back of catalyst particles towards the inside of the cyclone. In this manner, conventional cyclone-type separating systems virtually always operate under conditions of efficiency and profitability which are not ideal.

Figure 4:
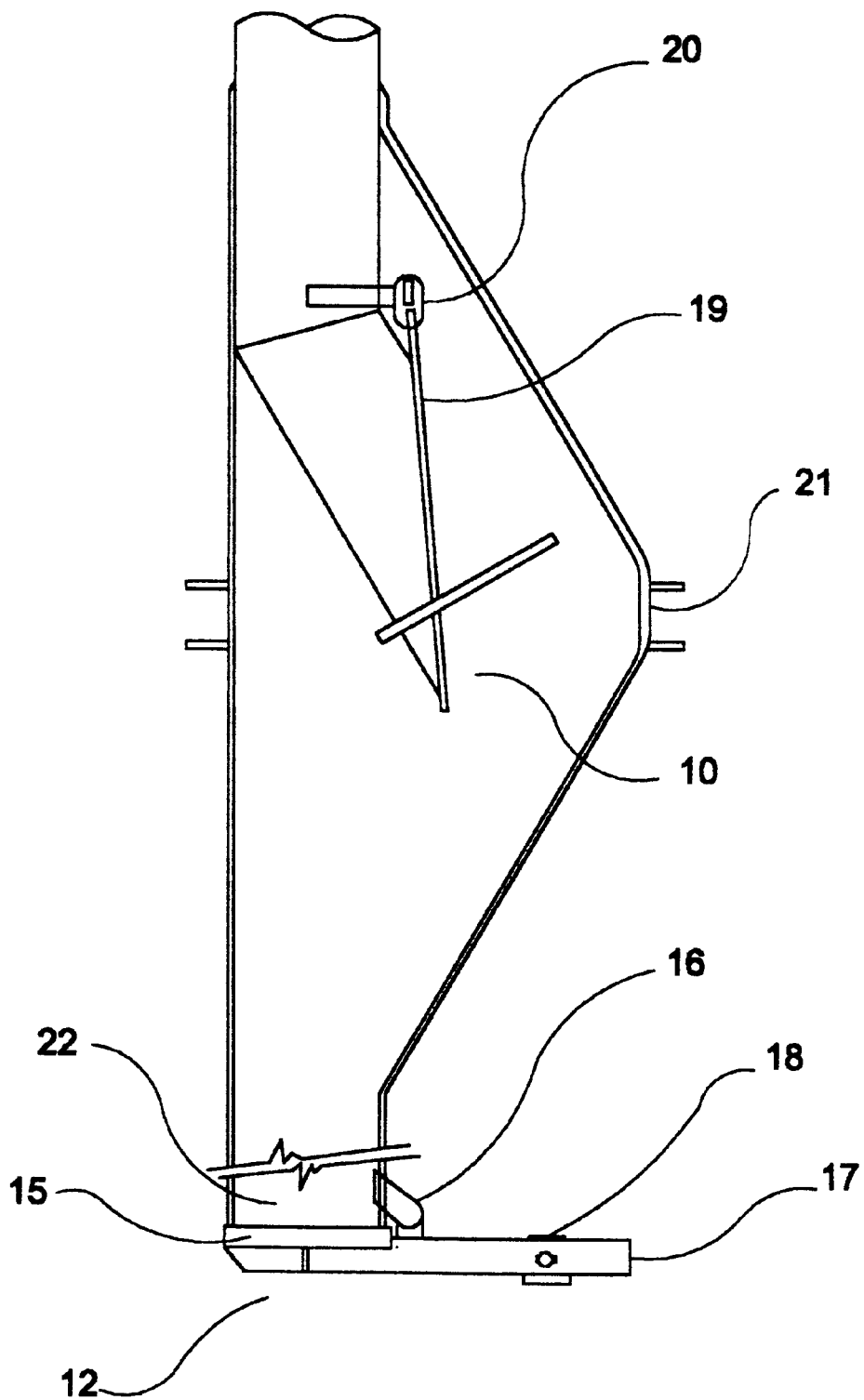
FIG. 4 is a side profile view of the preferred arrangement of the present invention, which includes two sealing valves mounted in series and on intermediate chamber for the accumulation of particles.

FIG. 4 shows a design for the sealing system according to the present invention, whose innovative solution uses two or more sealing valves mounted in series in one and the some cyclone leg to incorporate one or more intermediate solids-accumulation chambers. although FIG. 4 presents a drip valve and a deadweight valve in series, any other combination in terms of number or of type is also possible, and this shown arrangement may not in any way be regarded as a factor which limits the invention.

Using the sealing system shown in FIG. 4, at the start of the cracking process the inside of the intermediate solids-accumulation chamber 21 is empty and is isolated from the separating vessel by means of the lower, deadweight valve 12 which is maintained in the closed position by the thrust of the sealing disc 15 against the lower discharge end 22 of the chamber 21. This occurs because, at that instant, the combined effect of the internal pressure of the separating vessel and the action of the counterweight 18 via the arm 17 and the articulation 16 is greater than the effect of the internal pressure of the solids-accumulation chamber 21. The inside of the chamber 21 is also isolated from the cyclone by means of the upper, drip valve 10.

As the process for separating out the solid particles of the catalyst, which takes place in the cyclone-type separator, proceeds, the particulate material will be deposited at the bottom of the end of the leg of the cyclone, pressing on the metal plate 19 of the upper valve 10 until on account of the pressure of the column of accumulated particulate material, the valve finally opens and enables the deposit of accumulated particulate material to flow and to occupy the lower discharge end 22 of the intermediate solids-accumulation chamber 21.

Immediately after the accumulated particulate material has flowed out, the upper valve 10 closes again through (i) its own weight and (ii) the inclination of the plate 19 relative to the vertical plane. This process is repeated a number of times, the column of particulate inside the chamber 21 growing until the weight of that column is sufficient to open the lower valve 12, overcoming the counterweight 18 and the closure force of the sealing disc 15 resulting from the internal pressure of the separating vessel over the outer surface of the disc.

At the instant when the lower valve 12 opens, the particulate catalyst which has accumulated in the chamber 21 is able to enter the separating vessel and to flow towards the fluidized bed at its bottom. Virtually simultaneously, the pressure inside the chamber 21 is equalized with the pressure of the surrounding separating vessel and this prevents opening of the upper valve 10 until, through the action of the counterweight 18, the lid 15 of the lower valve 12 closes again, completing the cycle of discharging the particulate catalyst from its separating-out in the cyclone up to its deposition on the bottom of the separating vessel.

As may be readily observed when, throughout the cycle, one of the valves in the sealing system is open the other remains closed. This restricts the back-flow of particulate material into the inside of the intermediate solids-accumulation chamber 21, thereby totally preventing draw-back of the catalyst particles towards the cyclone and ensuring its satisfactory operation and maximum efficiency. In addition, by reducing the residence time of the particulate column inside the leg of the cyclone, and by producing good fluidization of the bed of solid which has accumulated in the intermediate solids-accumulation chamber, the system minimizes the risk of the beds of accumulated solid "packing down".

What is claimed is:

1. A sealing assembly for a leg of a cyclone for separating out solids in particulate suspension, comprising, at a lower end of the leg of the cyclone, at least two sealing valves mounted in series, thereby to define an intermediate solids-accumulation chamber between two successive said sealing valves; an upstream one of said valves, in a solids flow direction being disposed so as to seal between an inside of the leg of the cyclone upstream therefrom and an interior of the intermediate solids-accumulation chamber; and a downstream one of said valves in the solids flow direction being positioned so as to seal between the inside of the intermediate solids-accumulation chamber and an inside of a separating vessel disposed downstream in the solids flow direction from said cyclone leg for receiving separated solids therefrom.

2. An assembly according to claim 1, wherein said sealing valves mounted in series comprise at least one of a drip valve and a deadweight valve.

3. An assembly according to claim 1, wherein at least one of said sealing valves is an accumulated material weight responsive valve so that said at least one valve opens when a predetermined amount of material has accumulated adjacent thereto.

4. An assembly according to claim 3, wherein said sealing valves mounted in series comprise at least one of a drip valve and a deadweight valve.

5. An assembly according to claim 3, wherein said upstream valve and said downstream valve are each accumulated material weight responsive valves and wherein an accumulated weight to open said downstream valve is greater than an accumulated weight to open said upstream valve, said respective weights being interrelated such that when a pressure differential exists in the interior of the cyclone leg, the intermediate solids-accumulation chamber and the separating vessel, said upstream and downstream valves will not open simultaneously.

6. An apparatus for separating out solids in particulate suspension comprising:
a cyclone having an inlet for receiving a particulate suspension, a solids outlet and including a cyclone leg structure and a sealing assembly at a lower end of said cyclone leg, for selectively flowing accumulated solids from said cyclone leg to a separating vessel disposed downstream in a solids flow direction from said cyclone leg for receiving separated solids therefrom, said sealing assembly comprising, at a lower end of the leg of the cyclone, at least two sealing valves mounted in series, thereby to define an intermediate solids-accumulation chamber between two successive said sealing valves; an upstream one of said valves in a solids flow direction being disposed so as to seal between an inside of the leg of the cyclone upstream therefrom and an interior of the intermediate solids-accumulation chamber; and a downstream one of said valves in the solids flow direction being positioned so as to seal between the inside of the intermediate solids-accumulation chamber and an inside of the separating vessel.

7. An apparatus according to claim 6, wherein said sealing valves mounted in series comprise at least one of a drip valve and a deadweight valve.

8. An apparatus according to claim 6, wherein at least one of said sealing valves is an accumulated material weight responsive valve so that said at least one valve opens when a predetermined amount of material has accumulated adjacent thereto.

9. An apparatus according to claim 8, wherein said upstream valve and said downstream valve are each accumulated material weight responsive valves and wherein an accumulated weight to open said downstream valve is greater than an accumulated weight to open said upstream valve, said respective weights being interrelated such that when a pressure differential exists in the interior of the cyclone leg, the intermediate solids-accumulation chamber and the separating vessel, said upstream and downstream valves will not open simultaneously.

* * * * *